US009248517B2

United States Patent
Fujiwara (10) Patent No.: US 9,248,517 B2
(45) Date of Patent: Feb. 2, 2016

(54) SABER SAW

(71) Applicant: HITACHI KOKI CO., LTD., Tokyo (JP)

(72) Inventor: Masahiro Fujiwara, Ibaraki (JP)

(73) Assignee: HITACHI KOKI CO., LTD., Tokyo (JP)

( * ) Notice: Subject to any disclaimer, the term of this patent is extended or adjusted under 35 U.S.C. 154(b) by 222 days.

(21) Appl. No.: 13/782,832

(22) Filed: Mar. 1, 2013

(65) Prior Publication Data

US 2013/0227845 A1 Sep. 5, 2013

(30) Foreign Application Priority Data

Mar. 3, 2012 (JP) ................. 2012-047459

(51) Int. Cl.
*B23D 51/16* (2006.01)
*B23D 49/16* (2006.01)
*B23D 51/10* (2006.01)

(52) U.S. Cl.
CPC ............ *B23D 49/162* (2013.01); *B23D 49/165* (2013.01); *B23D 51/10* (2013.01); *B23D 51/16* (2013.01)

(58) Field of Classification Search
CPC ........ B23D 51/16; B23D 49/65; B23D 50/10; B23D 49/165; B23D 51/10
USPC .................................................. 30/392–394
See application file for complete search history.

(56) References Cited

U.S. PATENT DOCUMENTS

| 2,639,737 | A | 5/1953 | Forsberg |
| 6,249,979 | B1 * | 6/2001 | Bednar et al. .................. 30/392 |
| 7,013,567 | B2 * | 3/2006 | Myers ............................. 30/101 |
| 2005/0163408 | A1 * | 7/2005 | Wakabayashi et al. ....... 384/279 |
| 2005/0178012 | A1 | 8/2005 | Neitzell et al. |
| 2008/0052923 | A1 | 3/2008 | Moreno |

FOREIGN PATENT DOCUMENTS

| BE | 401823 A | 3/1934 |
| GB | 2 441 401 A | 3/2008 |
| JP | 2002-79417 A | 3/2002 |
| WO | 2006/065728 A2 | 6/2006 |

OTHER PUBLICATIONS

The extended European Search Report for the related European Patent Application No. 13157450.1 dated Jun. 17, 2013.

* cited by examiner

*Primary Examiner* — Ned Landrum
*Assistant Examiner* — Liang Dong
(74) *Attorney, Agent, or Firm* — Kenealy Vaidya LLP (57) ABSTRACT

A saber saw including: a motor; a housing accommodating the motor; a plunger held to be reciprocatable in the housing and to which a blade is mounted at a leading end thereof, and a movement converting part provided between the motor and the plunger and is configured to convert rotation movement of the motor into reciprocating movement of the plunger, wherein a bearing metal is fixed to an outer peripheral surface of the plunger.

8 Claims, 5 Drawing Sheets

SABER SAW

CROSS-REFERENCE TO RELATED APPLICATIONS

This application claims priority from Japanese Patent Application No. 2012-047459 filed on Mar. 3, 2012, the entire contents of which are incorporated herein by reference.

TECHNICAL FIELD

Aspects of the invention relate to a saber saw for cutting wood, steel, pipe and the like, and more particularly, to a saber saw having an improved holding mechanism in a plunger that reciprocates a blade.

BACKGROUND

As a reciprocating cutting tool that is driven by a driving source such as electric motor, a saber saw has been known. As well known, the saber saw reciprocates a reciprocating shaft (hereinafter, referred to as a plunger) having a substantially linear saw blade (hereinafter, referred to as a blade) mounted at a leading end thereof, thereby cutting wood, steel, pipe and the like by the blade.

Figure 7:
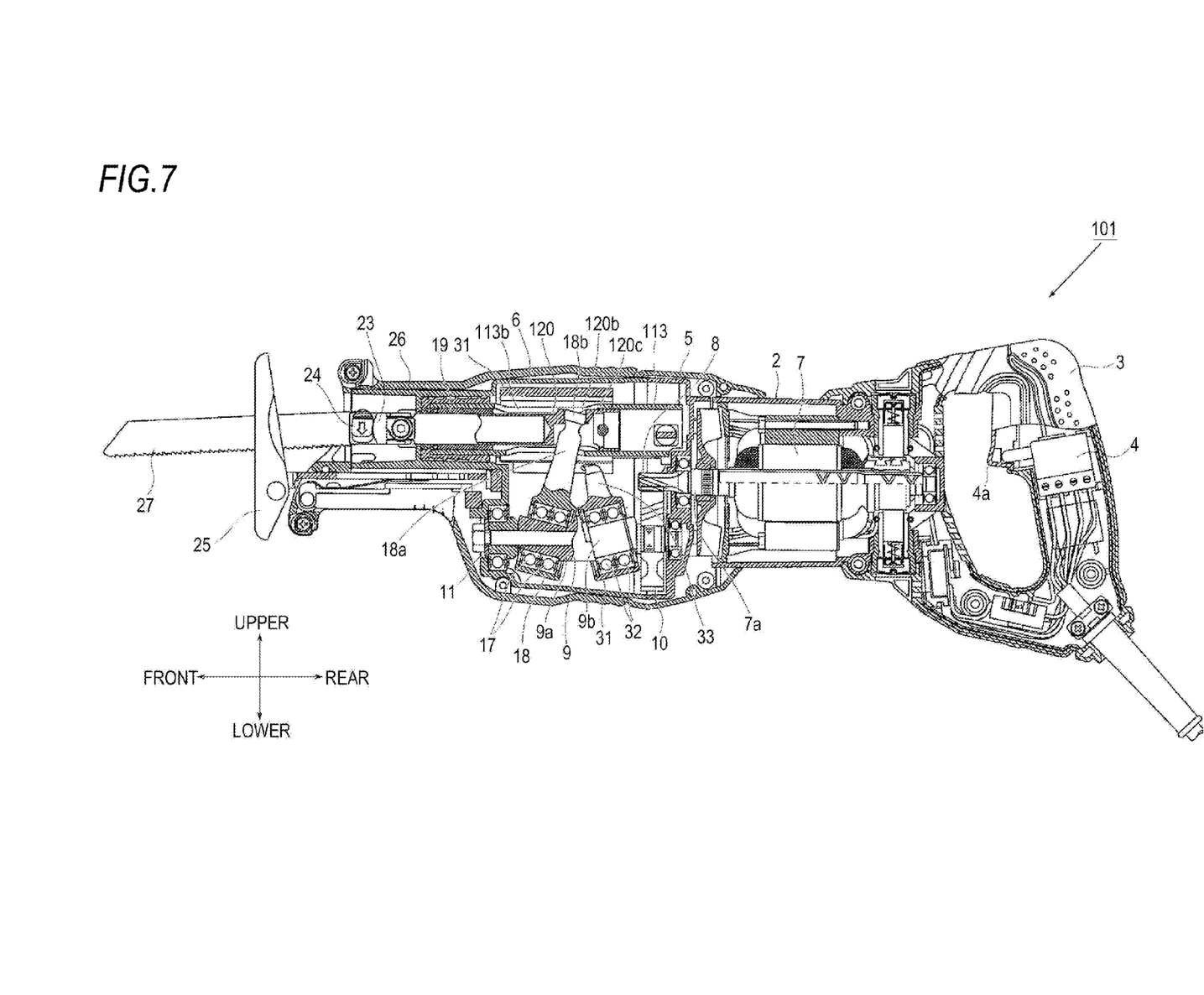
FIG. 7 is a longitudinal sectional view showing an overall configuration of a saber saw 101 according to the related art.

An example of a structure of a related-art saber saw is shown in FIG. 7 (see, for example, JP-A-2002-79417). FIG. 7 is a sectional view showing an entire saber saw 101 according to the related-art technology. A motor 7 is embedded in a motor housing 2 made of resin and a handle 3 is connected to a rear part of the motor housing 2. In the handle 3 having a D shape when in a side view, a switch 4 that controls power feed to the motor 7 is embedded. When a trigger 4a is pulled, the motor 7 is rotated. An inner cover 5 and gear cover 6 made of metal and accommodating a power transfer means are provided at the front of the motor housing 2. The motor housing 2 and a front cover 26 configure a housing of the invention. A part of an outer side of the housing is provided with the front cover 26 made of an electrical insulating and heat insulating elastic member having a large frictional coefficient. A base 25 for pressing and stabilizing the saber saw 101 body to a material to be cut upon a cutting operation is attached to a leading end-side corresponding to the front of the gear cover 6 so that it can be advanced and retreated. Upon the cutting operation, it is possible to stabilize the saber saw 101 by pushing the base 25 against the material to be cut.

A driving gear 8 is configured integrally with or by a separate member from a leading end of a motor shaft 7a. Rotation movement of the motor shaft 7a is converted into reciprocating movement of a plunger 120 by a movement converting part. The plunger 120 holds a blade 27 via a blade holder (blade holding unit) 23 at a front end portion of and reciprocates the blade 27 forward and backward, thereby cutting the material to be cut. The blade holder 23 is configured such that attach and detach of the blade 27 can be realized by one touch by operating a rotatable knob 24. The blade 27 can be mounted to the blade holder in an upper-lower reverse direction. The movement converting part that converts the rotation movement of the motor 7 into the reciprocating movement of the plunger 120 in the forward and backward direction includes a second shaft 9 that is provided in parallel with the motor shaft 7a, a driven gear 10 that is attached to the second shaft 9 so as not to be rotatable, a first inclined shaft part 9a that is provided at the front of the second shaft 9 and is provided with a predetermined angle relative to a shaft center of the driven gear 10, a second inclined shaft part 9b that has an opposite phase to the first inclined shaft part 9a and is provided with a predetermined angle relative to the shaft center of the driven gear 10, and a first reciprocating plate 18 and a second reciprocating plate 33 that are attached to the respective inclined shaft parts via bearings 17, 32.

As the driven gear 10 is engaged with the driving gear 8, the rotation of the electric motor 7 is decelerated with a predetermined reduction ratio and the second shaft 9 is rotated (deceleration unit). The rotation movement of the second shaft 9 is transferred as the rotation movement of the first inclined shaft part 9a and rotates the first reciprocating plate 18, which is held at the inclined shaft part by two bearings 17, and a sub shaft 11, which is provided to be concentric with the shaft center of the driven gear 10. A leading end of an oscillating shaft part 18a of the first reciprocating plate 18 is formed with a spherical part 18b. The spherical part 18b is positioned in an opening 120b of the plunger 120 and is rollably engaged in the opening with a slight gap. As the second shaft 9 is rotated, the first reciprocating plate 18 is moved forward and backward. Therefore, the plunger 120 is reciprocated forward and backward by the spherical part 18b that is positioned at an upper end of the first reciprocating plate 18 and in the opening 120b of the plunger 120. The plunger 120 is arranged inside a guide sleeve 113 attached to the gear cover 6 and is supported to an inside of a first bearing metal 19 attached to the guide sleeve 113 so that it can reciprocatingly slide in an axial direction. The first bearing metal 19 is a substantially cylindrical sliding bearing (or plain bearing) and an outer periphery thereof is fixed to the guide sleeve 113 and an inner periphery thereof slides with an outer peripheral surface of the plunger 120.

In the meantime, the exterior of the plunger 120 is provided with a balance weight 31 that is engaged with a portion of the plunger 120 and reciprocates forward and backward in an opposite phase to the plunger 120. The balance weight 31 is moved in the axial direction (front-rear direction) by the second reciprocating plate 33. The second reciprocating plate 33 is held at the second inclined shaft part 9b having a predetermined angle relative to the shaft center of the driven gear 10 via the bearings 32. As the second shaft 9 is rotated, the second reciprocating plate 33 is moved forward and backward in the opposite phase to the first reciprocating plate 18, thereby reciprocating the balance weight 31. The reciprocating movement of the balance weight 31 is configured to have an opposite phase to the plunger 120 enabling an inversion movement (movement having a phase difference of 180°).

In the saber saw 101, the plunger 120 slides inside the first bearing metal 19 and the guide sleeve 113. However, a large diameter part 120c of the plunger 120 and a fitting part of the guide sleeve 113 are not in a complete non-contact state and may partially contact upon the sliding. Thus, wearing and heat generation inevitably occurs, which becomes an obstacle in prolonging a lifespan of the saber saw. Also, in order to prolong the lifespan and to improve the rigidity of the saber saw, it is considered to enlarge the first bearing metal 19 (to lengthen the first bearing metal 19 in the axial direction). However, in this case, it is necessary to increase an axial length (front-rear length) of the guide sleeve 113 so as to be able to accommodate the enlarged first bearing metal 19. As a result, the saber saw 1 body is enlarged.

SUMMARY

The invention has been made to solve the above problem. An object of the invention is to provide a saber saw in which attaching rigidity of a plunger is improved to thus prolong the lifespan of the saber saw.

Another object of the invention is to provide a saber saw in which shaking or unpleasant vibration is reduced to thus improve the usability thereof.

Still another object of the invention is to provide a saber saw in which a support mechanism of a plunger to a guide sleeve is improved to thus make the saber saw smaller.

The representative features of the invention disclosed in the specification are as follows.

According to an aspect of the invention, there is provided a saber saw including: a motor; a housing accommodating the motor; a plunger held to be reciprocatable in the housing and to which a blade is mounted at a leading end thereof, and a movement converting part provided between the motor and the plunger and is configured to convert rotation movement of the motor into reciprocating movement of the plunger, wherein a bearing metal is fixed to an outer peripheral surface of the plunger.

In addition, other well-known converting mechanisms for converting rotation movement to reciprocating movement may also be adopted.

Accordingly, a holding method of an outer periphery sliding type is adopted in which the bearing metal is fixed to the outer peripheral surface of the plunger. Therefore, it is possible to easily attach the bearing metal just by changing a configuration of the plunger, so that it is possible to easily implement the configuration of the invention. Also, it is possible to increase the mass of the plunger, so that it is possible to improve the cutting ability owing to the increase of the inertia mass. Also, even when the inertial mass is increased, it is possible to reduce a sliding resistance by the bearing metal, so that is possible to smoothly move the plunger. Hence, it is possible to implement the saber saw in which the shaking or vibration is small and that can be easily used.

The above and other purposes and novel features of the invention will become apparent from the following descriptions and the accompanying drawings.

DETAILED DESCRIPTION

First Illustrative Embodiment

Hereinafter, illustrative embodiments of the invention will be described with reference to the accompanying drawings. Meanwhile, in the drawings, the same constitutional elements as those of the saber saw 101 according to the related-art are indicated with the same reference numerals and the overlapping descriptions are omitted. Also, in the specification, front, rear, left, right, upper and lower directions are described on the basis of the directions shown in the drawings.

Figure 1:
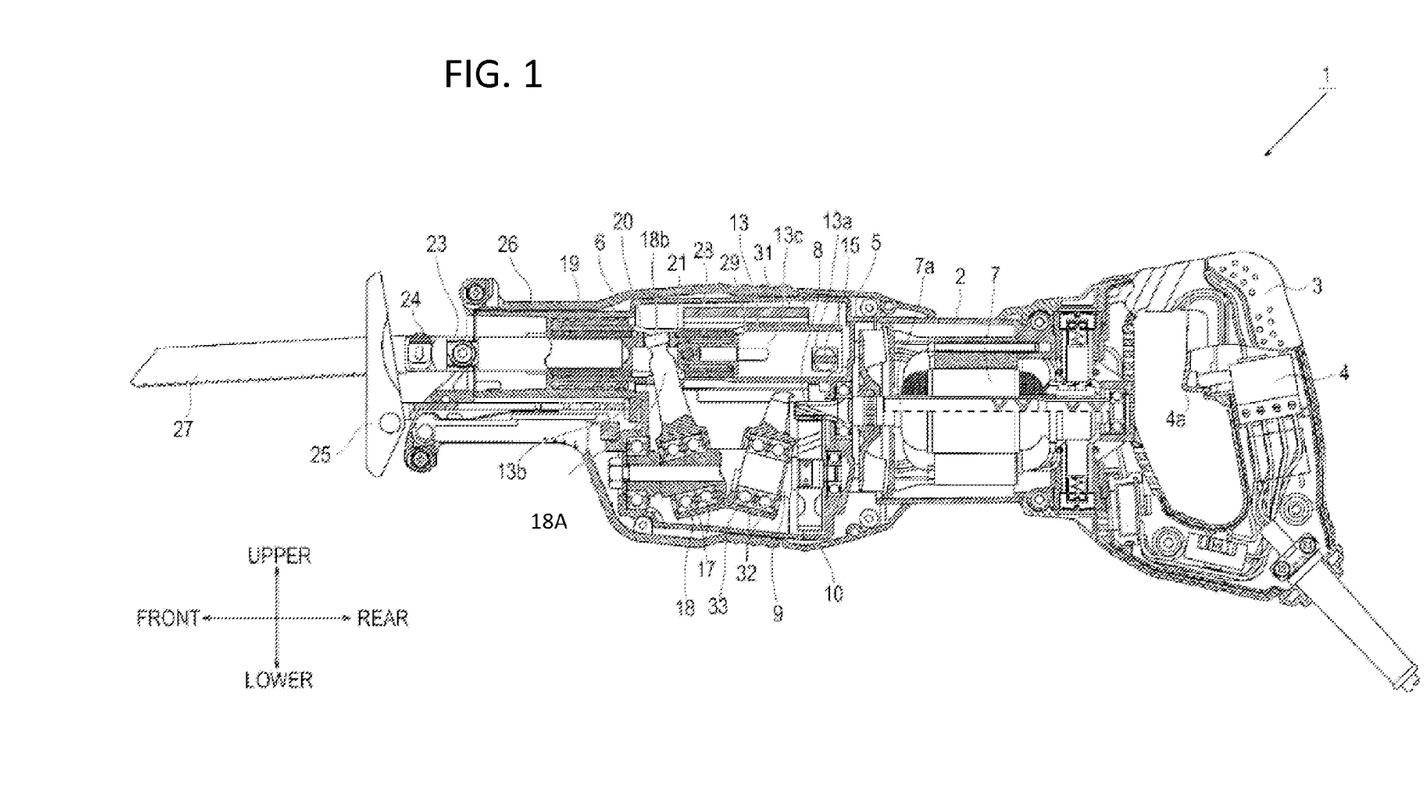
FIG. 1 is a longitudinally sectional view showing an overall configuration of a saber saw 1 according to an illustrative embodiment of the invention.

FIG. 1 is a sectional view showing an entire saber saw 1 according to an illustrative embodiment of the invention. In this illustrative embodiment, an attaching structure of the plunger 20 is mainly modified form the saber saw 101 shown in FIG. 7. That is, the plunger 20 is held at two positions at front and rear sides of the oscillating shaft part 18a of the first reciprocating plate 18 via the bearing members (the first bearing metal 19 and a second bearing metal 28) by the guide sleeve 13. In this illustrative embodiment, the plunger 20 reciprocates in the front-rear direction inside the gear cover 6. However, the substantially cylindrical guide sleeve 13 that swings the plunger 20 is provided for holding the reciprocating plunger 20 and for swing cutting. The guide sleeve 13 is provided outside the plunger 20 and inside the gear cover 6. The guide sleeve 13 is a cylindrical single member that continues from the front of the first reciprocating plate 18 to the rear thereof, and is manufactured by casting a steel material, for example. Screw holes (not shown) for enabling shaft bolts 12 (which will be described later) to penetrate therethrough are formed in the vicinity of a front end portion in the front-rear direction, a hollow hole 13b penetrated in the upper-lower direction through which the first reciprocating plate 18 can be inserted into the guide sleeve 13 is formed in the vicinity of the center portion, and a long hole 13c extending in the axial direction is formed in the vicinity of a rear end portion in the axial direction. The first bearing metal 19 and the second bearing metal 28 are cylindrical metal members, for example, are iron-based sintered materials having lubricant impregnated therein, are arranged between the guide sleeve 13 and the plunger 20 and have a function of smoothly sliding the guide sleeve and the plunger to thus prevent the loss of energy due to friction and to reduce the heat generation. The inner cover 5 and the gear cover 6 are made of metal such as aluminum alloy and the like.

The first bearing metal 19 is provided at an inner periphery of the front of the guide sleeve 13. The first baring metal 19 is a cylindrical member having a predetermined length in the front-rear direction, is fixed to the guide sleeve 13 and is a so-called inner diameter sliding type that slides at the inner diameter side thereof with the plunger 20. The axial length of the first bearing metal 19 is substantially same as or close to a stroke of the spherical part 18b in the front-rear direction and preferably enables a sufficient sliding area to be secured. The second bearing metal 28 is arranged in the vicinity of the rear end of the plunger 20 and at the rear of a through-hole 20b through which a portion of the oscillating shaft part 18a and the spherical part 18b are enabled to penetrate.

The inner periphery of the second bearing metal 28 is fixed so that it cannot move relative to the plunger 20 and slides on the outer periphery thereof with the inner peripheral surface of the guide sleeve 13. That is, the second bearing metal is a so-called outer diameter sliding type. In this illustrative embodiment, the guide sleeve 13 has the related-art configuration, as it is, so as to implement the configuration of the invention without changing the related-art saber saw 101 as much as possible. Therefore, the shape of the plunger is changed, compared to the related-art plunger 120. The plunger 20 is formed with a small diameter part 20e (refer to FIG. 2) for mounting the second bearing metal 28, and the second bearing metal 28 is fixed by a pressing member 29 so that it is not separated from the plunger 20.

(Oscillation Cutting Mechanism Unit)

The guide sleeve 13 is formed with the long hole 13c extending in the axial direction thereof. A roller shaft 21 penetrates h the long hole 13c and the plunger 20. Swing rollers (which will be described later) are rotatably mounted to both ends of the roller shaft 21 passing through the long hole 13c and the plunger 20, and the roller shaft 21 and the swing rollers are provided to reciprocate integrally with the plunger 20 while using the long hole 13c as a guide. A height of the long hole 13c is slightly larger than a shaft diameter of the roller shaft 21 and suppresses circumferential rotation of the plunger 20 via the roller shaft 21 by the guide sleeve 13, thereby preventing the blade 27 from falling over.

(Mechanism Unit for Supporting Both Ends of Plunger)

At the front portion of the guide sleeve 13, the first bearing metal 19 is press-fitted and the plunger 20 penetrated the first bearing metal 19 and is attached so that it can reciprocate. The second bearing metal 28 that slides with the inner periphery of the guide sleeve 13 is fixed to the rear end of the plunger 20 and the plunger 20 and the second bearing metal 28 integrally reciprocate at the same time. The roller shaft 21 penetrates the plunger 20, the second bearing metal 28 and the pressing member 29 and stops the diametrically rotating of the second bearing metal 28. The pressing member 29 is fixed by the roller shaft 21 and the inner diameter of the plunger 20, thereby stopping the deviation of the second bearing metal 28 in the reciprocating direction. The plunger 20 is formed with the through-hole 20b (refer to FIG. 2) perpendicular to the axial direction. The oscillating shaft part 18a of the first reciprocating plate 18 penetrates the plunger 20 and the spherical part 18b at the leading end thereof is rollably engaged in the through-hole 20b with a slight gap. The oscillating shaft part converts the rotation movement of the second shaft 9 into the reciprocating movement of the plunger 20.

Figure 2:
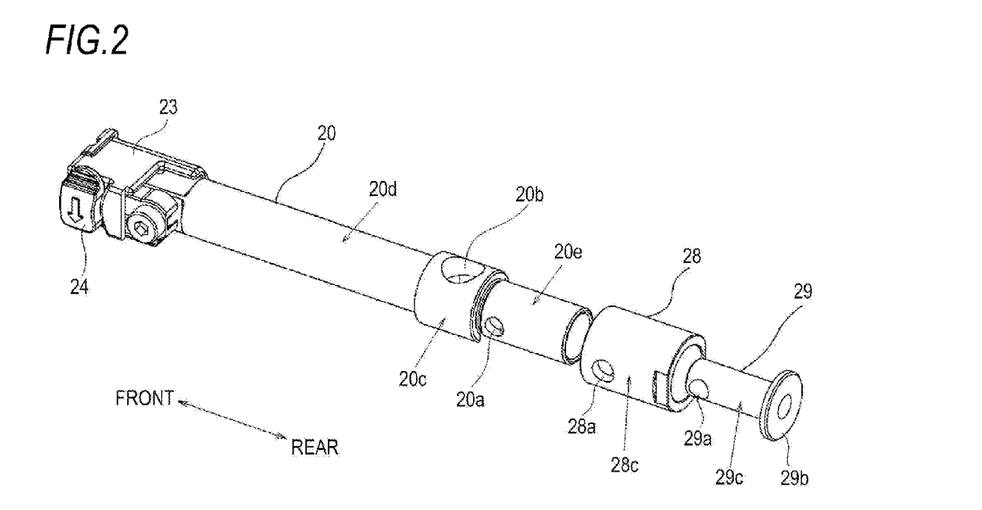
FIG. 2 is a perspective view showing shapes of a plunger 20, a second bearing metal 28 and a pressing member 29 shown in FIG. 1.

Here, shapes of the plunger 20, the second bearing metal 28 and the pressing member 29 are described with reference to FIG. 2. FIG. 2 is an exploded perspective view of the members. The shapes of the vicinity of the through-hole 20b of the plunger 20 through which the oscillating shaft part 18a penetrates and portions of the plunger at the front side thereof are the same as those of the related-art plunger 120. The front portion of the plunger 20 is provided with the blade holder 23, and the blade holder 23 is formed with the oscillating knob 24 for mounting and separating the blade 27. The front of a large diameter part 20c at which the through-hole 20b of the plunger 20 is formed is formed with a sliding surface 20d that slides with the first bearing metal 19. In the meantime, the rear of the large diameter part 20c of the plunger 20 is formed with the small diameter part 20e for holding the second bearing metal 28. The small diameter part 20e is inserted into the second bearing metal 28 from the rear side of the small diameter part and the second bearing metal is prevented from being separated from the rear side by the pressing member 29. The second bearing metal 28 is cylindrical and has an outer peripheral surface that is a sliding surface 28c.

A rear end of the pressing member 29 is formed with a disc-shaped flange part 29b. An outer diameter of the flange part 29b is larger than the inner diameter of the second bearing metal 28 and is the substantially same as or slightly smaller than the outer diameter thereof. The pressing member 29 is a molded part made of metal or high molecular resin. A cylindrical part 29c that is inserted into the inner diameter of the plunger 20 is connected at the front of the flange part 29b. The small diameter part 20e of the plunger 20 is formed with a through-hole 20a through which the roller shaft 21 (refer to FIG. 1) passes and the corresponding parts of the second bearing metal 28 and pressing member 29 are formed with through-holes 28a, 29a. The roller shaft 21 is enabled to pass through the through-holes 28a, 20a, 29a, so that the second bearing metal 28 and the pressing member 29 are prevented from being separated rearward from the plunger 20 in the axial direction. Also, since the roller shaft 21 passes through the respective members, the second bearing metal 28 is fixed so that it does not rotate about the axial direction relative to the plunger 20.

Again referring to FIG. 1, the second bearing metal 28 is provided to the rear end-side of the plunger 20, so that the reciprocating movement of the plunger 20 in the front-rear direction is enabled to inner diameter-slide by the first bearing metal 19 at the front side of the oscillating shaft part 18a and the hollow hole 13b and is enabled to outer diameter-slide by the second bearing metal 28 at the rear side of the oscillating shaft part 18a and the hollow hole 13b. At this time, a portion of the outer periphery of the second bearing metal 28 overlaps with the position of the hollow hole 13b. Therefore, it is preferable to polish a contact part of the guide sleeve 13 with the second bearing metal 28 so as to improve the sliding ability. The left and right sides of the guide sleeve 13 in the vicinity of the rear end thereof are formed with rectangular through-holes 13a. A change shaft 15 that passes through the inner cover 5 and is rotatably provided is arranged to pass through the rectangular through-holes 13a.

Figure 3:
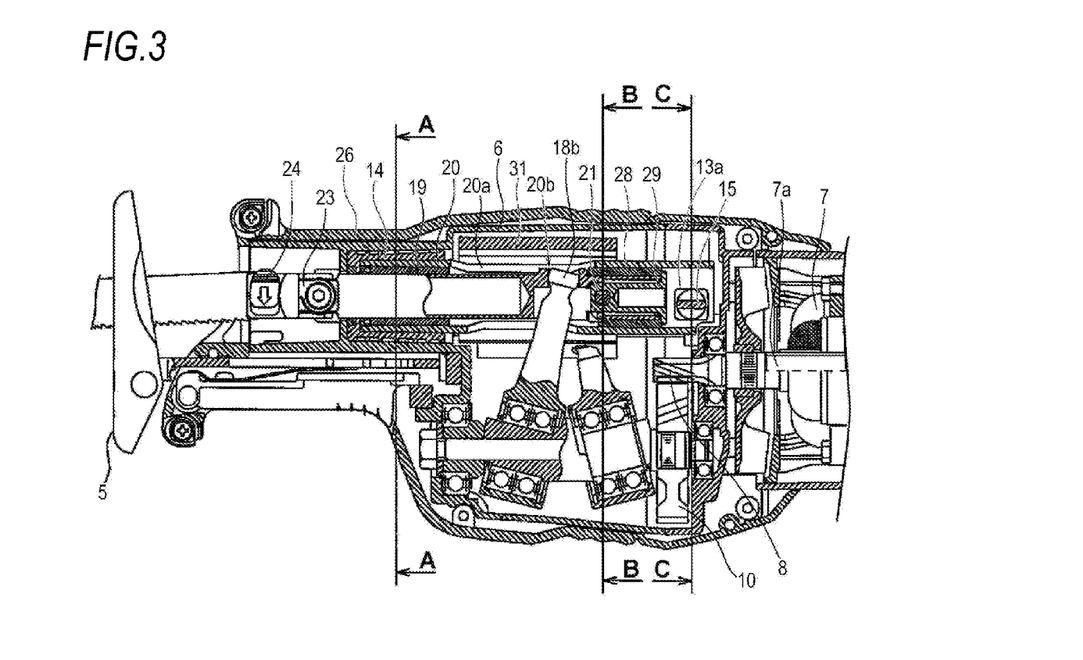
FIG. 3 is a partially enlarged view of the saber saw 1 shown in FIG. 1, which shows a state where the plunger 20 is moved from a state of FIG. 1.

FIG. 3 is a partially enlarged view of the saber saw 1 shown in FIG. 1 and is a partially sectional view showing a state where the plunger 20 is moved in the rear direction from a state of FIG. 1. FIG. 1 shows a state where the oscillating shaft part 18a of the first reciprocating plate 18 is most inclined forward and the plunger 20 is moved most in the front direction. Compared to this, FIG. 3 shows a state where the oscillating shaft part 18a of the first reciprocating plate 18 is most inclined backward and the plunger 20 is moved most in the rear direction. In this illustrative embodiment, since the second bearing metal 28 is an outer diameter sliding type and is attached to the plunger 20, it is possible to configure a length of a portion of the plunger 20 rear to the through-hole 20b to be short. If the second bearing metal 28 is attached to the guide sleeve 13 and is configured as an inner diameter sliding type, unless the length of the plunger 20 at rear side of the through-hole 20b is configured to be long, a portion that does not slide with the second bearing metal 28 will exist. Also, when the length at the vicinity of the rear end portion of the plunger 20 is lengthened, the length of the guide sleeve 13 should be correspondingly lengthened in the front-rear direction, so that the overall size of the saber saw 1 is increased.

In the illustrative embodiment, the second bearing metal 28 is fixed to the plunger 20. Thus, it is possible to implement the preferable sliding characteristic while the plunger 20 is configured to have the same length as the related-art plunger. Also, in this illustrative embodiment, the related-art guide sleeve 13 without change. Thus, the invention can be implemented just by changing the shape of the plunger 20 as shown in FIG. 2 and adding the second bearing metal 28 and the pressing member 29. As a result, it is possible to suppress the increase in the manufacturing cost. Also, the second bearing metal 28 as a metal mass body is provided in the vicinity of the rear end of the plunger 20 and the mass body consists of a relatively heavy iron-based member. Therefore, the mass of the reciprocating plunger 20 is increased, so that it is possible to improve the cutting ability of the blade 27.

Figure 4:
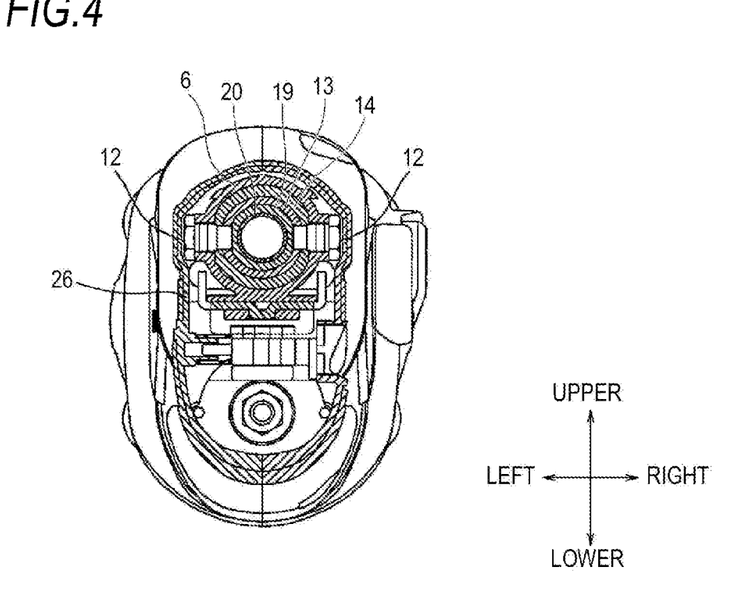
FIG. 4 is a sectional view taken along a line A-A of FIG. 3.

FIG. 4 is a sectional view taken along a line A-A of FIG. 3 and shows a structure of the reciprocating shaft holder. In the front cover 26, a seal sleeve 14 that seals chips, dusts and the like is provided. The seal sleeve 14 is accommodated in the gear cover 6. In the vicinity of the A-A section of the front of the gear cover 6, two shaft bolts 12 are attached from the sides. The guide sleeve 13 is attached to leading end portions of the shaft bolts 12 so that it can slightly oscillate about shaft centers of the shaft bolts 12. Here, a slight gap is actually formed between the inner peripheral surface of the gear cover 6 and the outer peripheral surface of the guide sleeve 13 (the gap is not shown in FIG. 4). The guide sleeve 13 can oscillate about the shaft centers of the shaft bolts 12 within a range of the gap. This is because the rectangular through-holes 13a (refer to FIG. 3) are formed at the rear end of the guide sleeve 13, and the oscillation of the guide sleeve 13 about the shaft bolts 12 is selectively permitted or suppressed by operating the change shaft 15 passing through the inner cover 5 and rotatably attached to the inner cover 5. The cylindrical first bearing metal 19 is provided inside the guide sleeve 13. The parts of the first bearing metal 19 contacting the leading ends of the shaft bolts 12 are cut, so that the first bearing metal partially forms a planar shape and is held so as not to rotate about the axial direction and not to move in the axial direction. The cylindrical plunger 20 is arranged inside the first bearing metal. The plunger 20 slides in the axial direction (front-rear direction) relative to the first bearing metal 19.

Figure 5:
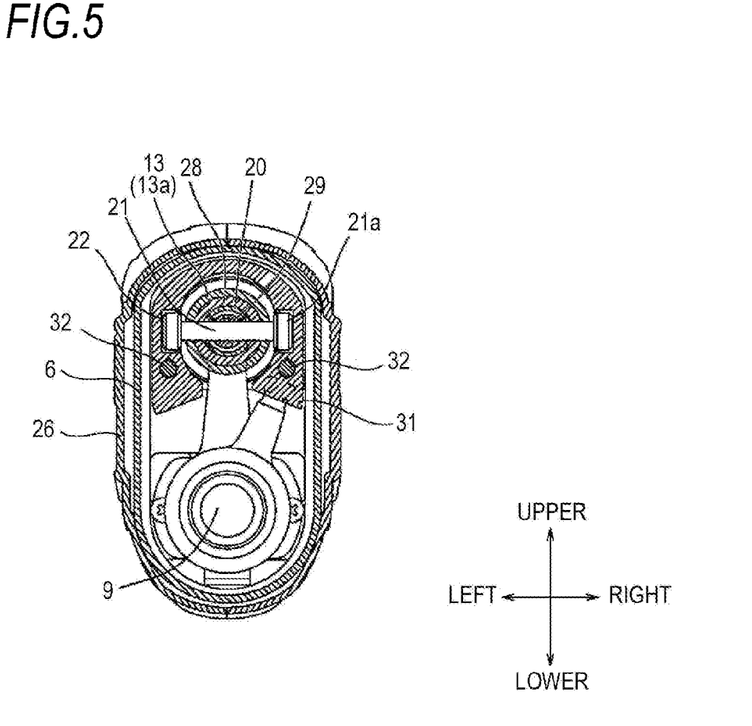
FIG. 5 is a sectional view taken along a line B-B of FIG. 3.

FIG. 5 is a sectional view taken along a line B-B of FIG. 3. The roller shaft 21 passes through the plunger 20 and is attached to the plunger 20. The roller shaft 21 can reciprocate forward and backward integrally with the plunger 20. Also, the swing rollers 21a are rotatably attached to both ends of the roller shaft 21. Inside the gear cover 6, a guide rail 22 having two track surfaces is formed. The guide rail 22 is formed to extend in the axial direction (moving direction) of the plunger 20. The respective track surfaces extend in parallel with each other and an interval thereof is slightly larger than an outer diameter of the swing roller 21a. The swing rollers 21a are guided by the two track surfaces and reciprocate integrally with the plunger 20. By the configuration, the circumferential rotation of the plunger 20 is suppressed via the roller shaft 29 and the two swing rollers 21a by the two track surfaces, so that the falling (rotation about the moving direction) of the blade 27 is prevented.

Figure 6:
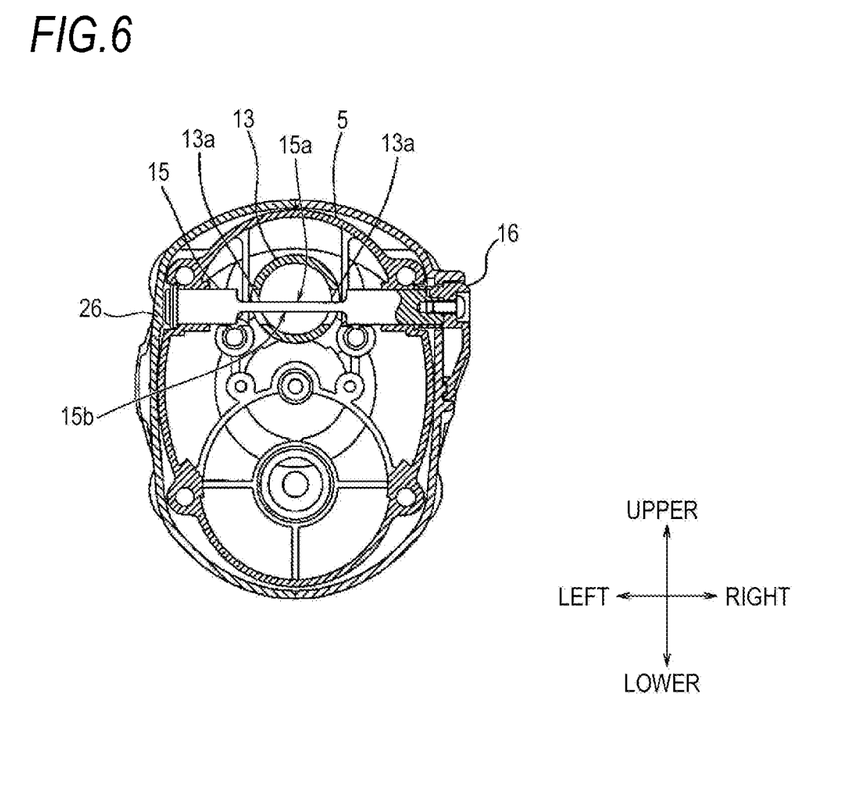
FIG. 6 is a sectional view taken along a line C-C of FIG. 3.

FIG. 6 is a sectional view taken along a line C-C of FIG. 3. In the meantime, compared to FIGS. 4 and 5, FIG. 6 shows a section perpendicular to the axial direction, which is seen from the rear side, not the front side. Thus, it should be paid attention that the left and the right are reverse. As shown, a central portion of the change shaft 15 is formed with a pair of recesses as if the change shaft were symmetrically notched in the diametrical direction about the shaft center. The parts of the change shaft 15 dividing the recesses are a pair of symmetrical planar parts 15a, 15b. By rotating the change shaft 15 with a changing lever 16, it is possible to selectively permit or suppress the oscillation of the guide sleeve 13. FIG. 5 shows a state where the oscillation of the guide sleeve 13 is permitted. Thereby, it is possible to selectively permit or suppress the oscillation of the plunger 20 that is supported via the first bearing metal 19 in the front of the guide sleeve 13.

According to the invention, the front and rear ends of the plunger 20 are supported by the bearing metals. Thus, it is possible to reduce the shaking or unpleasant vibration to thus improve the usability. Also, the friction or heat generation is suppressed, so that it is possible to prolong the lifespan of the saber saw. Also, the bearing metal is fixed to the rear end side of the plunger. Therefore, the bearing metal is integrated with the plunger and is enabled to reciprocate at the same time, so that it is possible to prevent the body from being enlarged due to the second bearing metal 19. Also, since the front and rear ends of the plunger 20 are supported by the bearing metals, it is possible to make the bearing metal (first bearing metal 19) of the front smaller, compared to the related-art configuration. In this case, it is possible to make the saber saw smaller.

Although the invention has been described with reference to the illustrative embodiment, a variety of changes can be made without departing from the scope of the invention. For example, in the above illustrative embodiment, the invention has been applied to the saber saw. However, the invention can be also applied to the other electric tool or power tool insomuch as the tool is a reciprocating tool having a guide sleeve and a plunger and moving the plunger by a reciprocating plate. Also, the movement converting part that converts the rotation movement of the motor into the reciprocating movement of the plunger is not limited to the structure described in the above illustrative embodiment and any movement converting part may be used.

The present invention provides illustrative, non-limiting aspects as follows:

(1) In a first aspect, there is provided a saber saw including: a motor; a housing accommodating the motor; a plunger held to be reciprocatable in the housing and to which a blade is mounted at a leading end thereof, and a movement converting part provided between the motor and the plunger and is configured to convert rotation movement of the motor into reciprocating movement of the plunger, wherein a bearing metal is fixed to an outer peripheral surface of the plunger.

In addition, other well-known converting mechanisms for converting rotation movement to reciprocating movement may also be adopted.

According to the first aspect, a holding method of an outer periphery sliding type is adopted in which the bearing metal is fixed to the outer peripheral surface of the plunger. Therefore, it is possible to easily attach the bearing metal just by changing a configuration of the plunger, so that it is possible to easily implement the configuration of the invention. Also, it is possible to increase the mass of the plunger, so that it is possible to improve the cutting ability owing to the increase of the inertia mass. Also, even when the inertial mass is increased, it is possible to reduce a sliding resistance by the bearing metal, so that is possible to smoothly move the plunger. Hence, it is possible to implement the saber saw in which the shaking or vibration is small and that can be easily used.

(2) In a second aspect, there is provided the saber saw according to the first aspect, wherein a gear cover is arranged inside the housing, and wherein the plunger is held to be reciprocatable inside the gear cover via the bearing metal.

According to the second aspect, the gear cover is arranged in the housing, and the plunger is held to slide relative to the gear cover via the bearing metal. Hence, it is possible to increase the attaching rigidity of the plunger.

(3) In a third aspect, there is provided the saber saw according to the second aspect, further comprising a guide sleeve arranged at an inner side of the gear cover and holding the plunger to be reciprocatable, wherein the plunger is configured to slide relative to the guide sleeve via the bearing metal.

According to the third aspect, the guide sleeve that holds the plunger to reciprocate is provided and the bearing metal slides relative to the guide sleeve. Therefore, it is possible to reduce the sliding resistance while realizing a swing mechanism (swing cutting) implemented by the guide sleeve.

(4) In a fourth aspect, there is provided the saber saw according to the third aspect, wherein a first bearing metal is provided at a front portion of the plunger and a second bearing metal is provided at a rear portion of the plunger, and wherein at least one of the first and second bearing metals is fixed to the plunger.

According to the fourth aspect, the first bearing metal is provided at the front portion of the plunger, the second bearing metal is provided at the rear portion of the plunger, and at least one of the first and second bearing metals is fixed to the plunger. Accordingly, since two bearing metals hold the reciprocating movement of the plunger, it is possible to implement the saber saw having high rigidity in which the reciprocating movement is smoothly made and the shaking or vibration is thus small.

(5) In a fifth aspect, there is provided the saber saw according to the fourth aspect, wherein the first bearing metal is fixed to the guide sleeve, and wherein the second bearing metal is fixed to the plunger and is configured to reciprocate together with the plunger.

According to the invention of fifth aspect, the first bearing metal is fixed to the guide sleeve, and the second bearing metal is fixed to the plunger. Thus, it is possible to easily implement the invention simply by changing the structure of the rear portion of the plunger while adopting the structure of the related-art saber saw at the front portion. Further, since the bearing metal as a mass body is attached to an end portion at the other side of the blade of the plunger that reciprocates, cutting characteristic is improved due to increase in inertial mass.

(6) In a sixth aspect, there is provided the saber saw according to claim the fourth or fifth aspect, wherein the guide sleeve is a single member extending in the front-rear direction, covering the plunger, and abutting on or sliding with the first and second bearing metals, respectively.

According to the invention of sixth aspect, the guide sleeve is a single member extending in the front-rear direction to cover the plunger. Thus, it is possible to increase the rigidity of the object on which the two bearing metals slide, thereby remarkably improving the sliding characteristic.

(7) In a seventh aspect, there is provided the saber saw according to any one of the fourth to sixth aspects, wherein the guide sleeve is substantially cylindrical and the first bearing metal is fixed to an inner periphery of a front portion of the guide sleeve.

According to the seventh aspect, the guide sleeve is substantially cylindrical and the first bearing metal is fixed to the inner periphery of the front portion of the guide sleeve. Thus, it is possible to implement a so-called swing cutting function in which the blade is slightly oscillated by oscillating the guide sleeve.

(8) In an eighth aspect, there is provided the saber saw according to the seventh aspect, wherein the movement converting part includes: a second shaft configured to be rotated by the motor in the housing, and a reciprocating plate being attached to the second shaft and configured to move the plunger.

According to the eighth aspect, the movement converting part includes the second shaft that is rotated and the reciprocating plate that is attached to the second shaft. Therefore, it is possible to easily convert the rotation movement of the motor into the reciprocating movement of the plunger in the front-rear direction.

(9) In a ninth aspect, there is provided the saber saw according to the eighth aspect, wherein the guide sleeve has a hole into which the reciprocating plate is configured to be inserted, and wherein the first bearing metal reciprocates within a range including an area of the hole.

According to the invention of ninth aspect, since it is not necessary to extend the guide sleeve to the rear side, it is possible to shorten an entire length of the saber saw.

(10) In a tenth aspect, there is provided the saber saw according to the ninth aspect, wherein a flange part is formed to the plunger, wherein the second bearing metal is inserted rear to the flange part, and wherein a pressing member is provided to a rear portion of the second bearing metal and is configured to prevent the second bearing metal from being separated.

According to the tenth aspect, the second bearing metal is inserted at a rear side of the flange part of the plunger, and the second bearing metal is prevented from being separated from the rear portion of the plunger by the pressing member. Thus, it is possible to securely fix the second bearing metal.

(11) In an eleventh aspect, there is provided the saber saw according to the tenth aspect, wherein a flange part that holds a rear end of the second bearing metal is formed to the pressing member, and wherein the pressing member enables a roller shaft, which is inserted into the plunger, to penetrate therethrough, thereby preventing the pressing member from being separated from the plunger.

According to the eleventh aspect, the pressing member enables the roller shaft, which is inserted into the plunger, to penetrate therethrough, so that the pressing member is prevented from being separated from the plunger. Therefore, it is possible to hold the pressing member by using the related-art roller shaft without using a new member so as to prevent the separation.

What is claimed is:

1. A saber saw comprising:
   a motor;
   a housing accommodating the motor;
   a gear cover arranged inside the housing;
   a guide sleeve arranged at an inner side of the gear cover;
   a plunger held to be reciprocatable inside the guide sleeve and to which a blade is mounted at a leading end thereof, and
   a movement converting part provided between the motor and the plunger and is configured to convert rotation movement of the motor into reciprocating movement of the plunger,
   wherein a first bearing metal is provided at a front portion of the plunger and a second bearing metal is provided at a rear portion of the plunger and the second bearing metal is mounted and fixed to an outer peripheral surface of the plunger,
   wherein the second bearing metal and the plunger are two separate structures,
   wherein the plunger is configured to slide relative to the guide sleeve via the second bearing metal, and
   wherein the second bearing metal is made of iron-based sintered materials having lubricant impregnated therein.

2. The saber saw according to claim 1, wherein the first bearing metal is fixed to the guide sleeve, and
   wherein the second bearing metal is configured to reciprocate together with the plunger.

3. The saber saw according to claim 1, wherein the guide sleeve is a single member extending in the front-rear direction, covering the plunger, and abutting on or sliding with the first and second bearing metals, respectively.

4. The saber saw according to claim 1, wherein the guide sleeve is substantially cylindrical and the first bearing metal is fixed to an inner periphery of a front portion of the guide sleeve.

5. The saber saw according to claim 4, wherein the movement converting part comprises:
   a second shaft configured to be rotated by the motor in the housing, and
   a reciprocating plate being attached to the second shaft and configured to move the plunger.

6. The saber saw according to claim 5, wherein the guide sleeve has a hole into which the reciprocating plate is configured to be inserted, and
   wherein the first bearing metal reciprocates within a range including an area of the hole.

7. The saber saw according to claim 6, wherein a flange part is foamed to the plunger,
   wherein the second bearing metal is inserted rear to the flange part, and
   wherein a pressing member is provided to a rear portion of the second bearing metal and is configured to prevent the second bearing metal from being separated.

8. The saber saw according to claim 7, wherein a flange part that holds a rear end of the second bearing metal is formed to the pressing member, and
   wherein the pressing member enables a roller shaft, which is inserted into the plunger, to penetrate therethrough, thereby preventing the pressing member from being separated from the plunger.

* * * * *